(12) United States Patent
Yanagi et al.

(10) Patent No.: US 7,647,820 B2
(45) Date of Patent: Jan. 19, 2010

(54) DEVICE FOR DETECTING LEAKAGE OF LIQUID IN TANK

(75) Inventors: Kiyotaka Yanagi, Ageo (JP); Atsushi Koike, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 415 days.

(21) Appl. No.: 11/791,881

(22) PCT Filed: Nov. 21, 2005

(86) PCT No.: PCT/JP2005/021365

§ 371 (c)(1),
(2), (4) Date: May 25, 2007

(87) PCT Pub. No.: WO2006/057220

PCT Pub. Date: Jun. 1, 2006

(65) Prior Publication Data

US 2008/0115565 A1   May 22, 2008

(30) Foreign Application Priority Data

Nov. 29, 2004   (JP)   ............................. 2004-344108

(51) Int. Cl.
*G01M 3/04* (2006.01)
(52) U.S. Cl. ...................................................... 73/49.2
(58) Field of Classification Search .................. 73/49.2; 340/605
See application file for complete search history.

(56) References Cited

U.S. PATENT DOCUMENTS

| 5,086,644 | A | * | 2/1992 | Schendel | ..................... | 73/49.2 |
| 6,595,049 | B1 | * | 7/2003 | Maginnis et al. | ............ | 73/202.5 |
| 6,920,778 | B2 | * | 7/2005 | Koike et al. | ................... | 73/49.2 |
| 7,334,455 | B2 | * | 2/2008 | Yanagi et al. | ................. | 73/49.2 |

(Continued)

FOREIGN PATENT DOCUMENTS

JP   58-086429   5/1983

(Continued)

*Primary Examiner*—John Fitzgerald
(74) *Attorney, Agent, or Firm*—Frommer Lawrence & Haug LLP; Ronald R. Santucci

(57) ABSTRACT

A device for detecting leakage of liquid in a tank, in which, even if the liquid in the tank is a low viscosity liquid, degradation in flow rate measurement accuracy by an indirectly heated flow rate meter can be suppressed, so that a very fine amount of leakage can be accurately detected for a long period without degradation in detection accuracy. The liquid in the tank that is led in and out from a liquid lead-in/lead-out section (12) is lead in and out from the lower end of a measurement fine tube (13b, 13b', 13") positioned in the flow rate measurement section (13). A measurement tube (17) of a liquid storage section (14) is connected to the upper end of the measurement fine tube. The measurement tube (17) has a larger cross-sectional area than the measurement fine tube. The device has a flow rate sensor section that is attached to the measurement fine tube and measures the flow rate of the liquid. The flow rate sensor section includes a heater (135) and temperature sensors (133, 134). The distance L1 in the measurement fine tube measured from a position corresponding to the heater (135) to an upper end opening of the measurement fine tube is not less than 20 mm and not more than 45 mm.

11 Claims, 11 Drawing Sheets

U.S. PATENT DOCUMENTS 7,574,897 B2 * 8/2009 Koike et al. .................. 73/49.2

FOREIGN PATENT DOCUMENTS

| JP | 11-190647 | 7/1999 |
| JP | 2001-304934 | 10/2001 |
| JP | 2003-185522 | 7/2003 |
| JP | 2003-214974 | 7/2003 |
| JP | 2003-302271 | 10/2003 |

* cited by examiner

DEVICE FOR DETECTING LEAKAGE OF LIQUID IN TANK

This application is a 371 of PCT/JP2005/021365 filed on Nov. 21, 2005, published on Jun. 1, 2006 under publication number WO 2006/057220 A1 which claims priority benefits from Japanese Patent Application Number 2004-344108 filed Nov. 29, 2004, the disclosure of which is hereby incorporated by reference.

TECHNICAL FIELD

The present invention relates to a device for detecting leakage of liquid in a tank and, more specifically, to a device for detecting leakage of liquid from a tank by converting it into a flow value based on the liquid level variation of liquid in a tank.

BACKGROUND ART

Fuel oil or various liquid chemicals are stored in a tank. The tank may suffer some cracks due to time degradation. In this case, liquid in the tank leaks from the tank. It is very important to detect such leakage as soon as possible and cope with it adequately for preventing explosion and fire hazard, ambient pollution, or generation of poisonous gas.

As a detection device for detecting leakage of liquid in a tank in the shortest possible time, JP(A)-2003-185522 (Patent Document 1) has proposed a configuration that includes a measurement pipe into which liquid in a tank is introduced and a measurement slim-pipe provided below the measurement pipe and measures the liquid flow rate inside the measurement slim-pipe using a sensor section additionally provided to the measurement slim-pipe to detect a minute variation of the liquid surface in the tank, i.e., a liquid level variation.

In this liquid leakage detection device, an indirectly heated flowmeter is used as a sensor additionally provided to the measurement slim-pipe. In this flowmeter, a current is applied to heat a heating element, and a part of the heating value is allowed to be absorbed by liquid. Then, the heat absorption value of the liquid varies in accordance with the liquid flow rate. This characteristic is used to detect influence of the heat absorption based on a variation in an electrical characteristic value such as a resistance value caused by a temperature variation of a temperature-sensitive element.

The liquid leakage detection device disclosed in Patent Document 1 is substantially vertically inserted into the tank through a measurement port formed on the upper portion of the tank. The upper portion of the detection device is fixedly held by the tank measurement port, whereby the measurement pipe, measurement slim-pipe, and sensor section are fixed to the upper portion of the tank.

Patent Document 1: JP(A)-2003-185522

DISCLOSURE OF THE INVENTION

Problems to be Solved by the Invention

In the leakage detection device using the indirectly heated flowmeter, the liquid flow rate inside the measurement slim-pipe is measured and, based on the measured liquid flow rate, leakage detection is determined. At this time, liquid in the measurement slim-pipe is heated by the heating element (heater), so that the temperature of the liquid is increased at the heated part to cause a convection flow in the measurement slim-pipe.

The convection flow in the measurement slim-pipe can be ignored in the case where the flowability of liquid is low, i.e., the kinetic viscosity of liquid is high, while it may significantly influence a result of flow rate measurement in the case where the flowability of liquid is high, i.e., the kinetic viscosity of liquid is low. For example, in the case where liquid to be measured is gasoline and therefore the kinetic viscosity is low (temperature: 20° C., kinetic viscosity: 0.8 $mm^2/s$), a convection flow generated in the measurement slim-pipe cannot be ignored. That is, an unignorable factor arising due to the convection flow is included in the value of the flow rate to be measured by the indirectly heated flowmeter, which may deteriorate the leakage detection accuracy.

Especially, in the case where there is actually no variation in the liquid level of liquid in the tank and therefore the liquid flow rate in the measurement slim-pipe to be detected is 0, only the liquid flow rate caused by the convection flow is measured by the indirectly heated flowmeter. As described above, in the case where the variation in the liquid level of liquid in the tank is small, the influence that the convection flow exerts on a flow rate measurement result becomes relatively high.

In the case where a leakage amount to be detected is extremely small, a flow rate value serving as a criterion for determining presence/absence of the leakage is small, so that the influence that the convection flow exerts on the determination becomes significantly large, resulting in deterioration of the leakage detection accuracy.

An object of the present invention is to provide a device for detecting leakage of liquid in a tank capable of suppressing deterioration in the accuracy of the flow rate measurement even in the case where liquid to be measured in the tank is low viscosity liquid and thereby detecting even extremely small amount of leakage over a longer span of time without generating deterioration in the detection accuracy.

Means for Solving the Problems

To achieve the above object, according to an aspect of the present invention, there is provided a device for detecting leakage of liquid in a tank characterized by comprising: a measurement slim-pipe into/from the lower end of which the liquid in a tank is injected or discharged; a measurement pipe connected to the upper end of the measurement slim-pipe and having a cross-section area larger than that thereof; a flow rate sensor section which is additionally provided to the measurement slim-pipe and which is used for measuring the flow rate of the liquid in the measurement slim-pipe, in which the flow rate sensor section includes a heater and a temperature sensor, and the dimension of the measurement slim-pipe is set such that a distance between the position corresponding to the heater of the measurement slim-pipe and the upper opening end thereof becomes a value in the range of 20 mm to 45 mm.

In the aspect of the present invention, the length of the measurement slim-pipe is set to a value in the range of 30 mm to 65 mm. In the first aspect of the present invention, the cross-section area of the inside of the measurement slim-pipe is set to a value in the range of 0.75 $mm^2$ to 5 $mm^2$.

In first aspect of the present invention, the measurement slim-pipe includes a first portion positioned inside a package defining the flow rate sensor section and a second portion connected to the upper end of the first portion. In the aspect of the present invention, the second portion is attached to the package. In the aspect of the present invention, the second portion is protruded inside the measurement pipe.

In the aspect of the present invention, the temperature sensor includes a first temperature sensor and a second temperature sensor, and the flow rate sensor section includes the first temperature sensor, heater, and second temperature sensor which are sequentially arranged along the measurement slim-pipe.

In the aspect of the present invention, the device further includes a leakage detection controller connected to the flow rate sensor section, the leakage detection controller having a voltage generation circuit for applying a voltage to the heater and a leakage detection circuit connected to the first and second temperature sensors and generating an output corresponding to a difference between temperatures detected by the first and second temperature sensors, and detecting leakage of the liquid in the tank based on a value equivalent to the liquid flow rate calculated using the output of the leakage detection circuit. In the aspect of the present invention, the device further includes a pressure sensor for measuring the liquid level of the liquid, and the leakage detection controller detects leakage of the liquid in a tank based on the magnitude of a liquid level variation rate with respect to time which is measured by the pressure sensor. In the aspect of the present invention, when detecting leakage of the liquid in the tank based on the magnitude of the liquid level variation rate with respect to time, the leakage detection controller outputs a result of the leakage detection in the case where the magnitude of the liquid level variation rate with respect to time falls within a predetermined range; outputs a result of the leakage detection based on the value equivalent to the liquid flow rate in the case where the magnitude of the liquid level variation rate with respect to time falls below the predetermined range; and stops the output of a leakage detection signal in the case where the magnitude of the liquid level variation rate with respect to time falls above the predetermined range. In the aspect of the present invention, in the case where the magnitude of the liquid level variation rate with respect to time falls above the predetermined range when detecting leakage of the liquid in the tank based on the magnitude of the liquid level variation rate with respect to time, the leakage detection controller stops the leakage detection based on the value equivalent to the liquid flow rate for a predetermined time length.

Advantages of the Invention

According to the present invention, the dimension of the measurement slim-pipe is set such that a distance between the position corresponding to the heater of the flow rate sensor section additionally provided to the measurement slim-pipe and the upper opening end of the measurement slim-pipe becomes a value in the range of 20 mm to 40 mm. Thus, even in the case where the liquid in the tank has a comparatively low viscosity, it is possible to prevent the accuracy of the flow rate measurement by the indirectly heated flowmeter from being deteriorated, making it possible to detect even extremely small amount of leakage over a longer span of time without generating deterioration in the detection accuracy.

Figure 1:
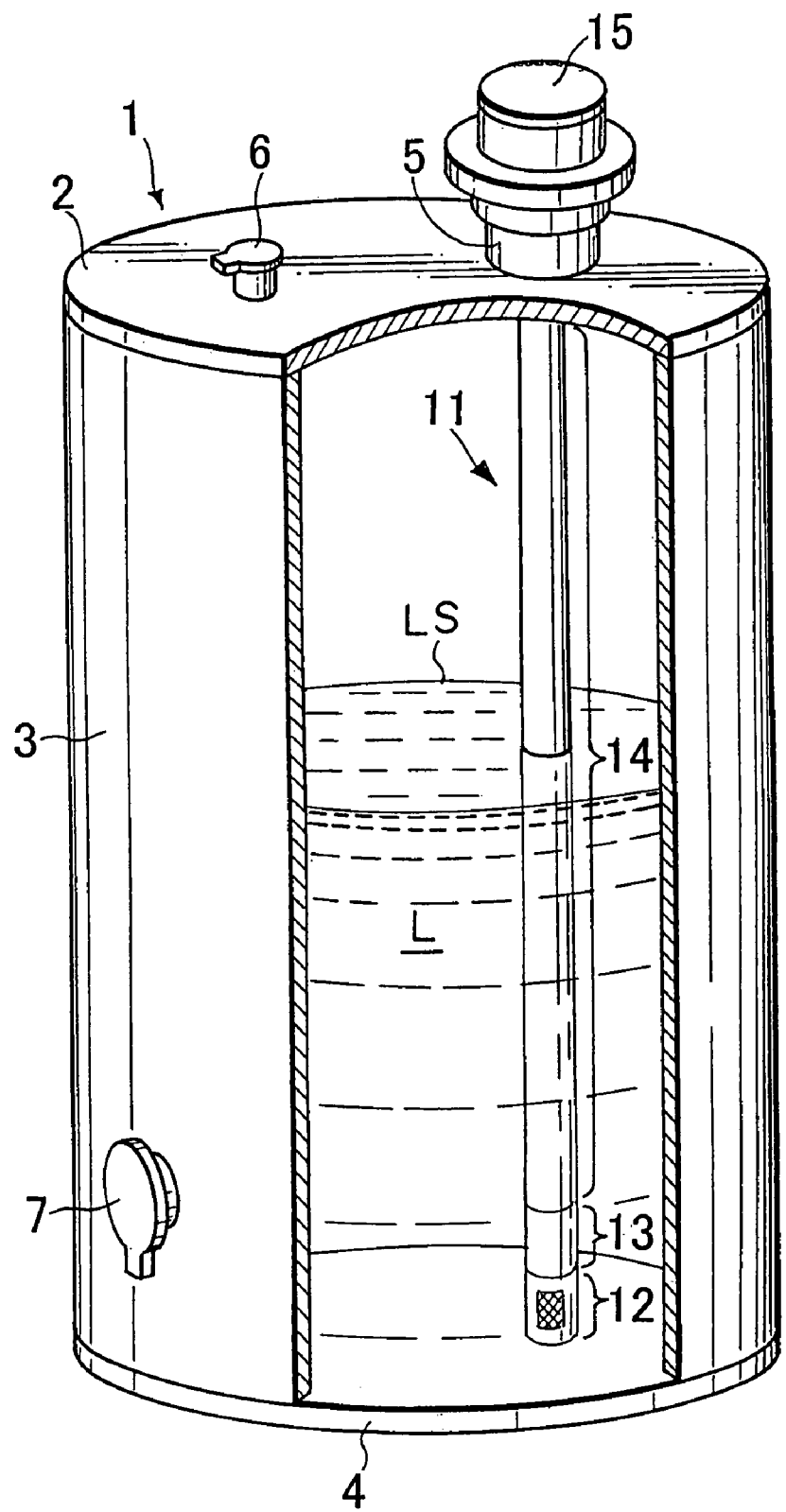
FIG. 1 is a partly broken perspective view for explaining a device for detecting leakage of liquid in a tank according to an embodiment of the present invention.

In the drawings, reference numeral 1 denotes a tank, 2 top panel, 3 side panel, 4 bottom panel, 5 measurement port, 6 liquid inlet, 7 liquid supply port, L liquid, LS liquid surface, 11 leakage detection device, 12 liquid inlet/outlet, 12a filter, 12b filter cover, 13 flow rate measurement section, 130 package, 13a sensor holder, 13b measurement slim-pipe first portion, 13b' measurement slim-pipe second portion, 13b" measurement slim-pipe third portion, 133 first temperature sensor, 134 second temperature sensor, 135 heater, 137 pressure sensor, 14 liquid pool section, G space, 15 circuit container, 15a leakage detection controller, 16 cap, 16a air path, 17,171 sheath pipe, Pg guide pipe, 18 wiring, 181 heat transfer member, 182 thin-film heating element, 182' wiring, 23 plastic sealing member, 24 wiring board, 60,61 thin-film temperature sensitive element, 62,63 resistor, 65 differential amplifier, 66 A/D converter, 67 voltage generation circuit, 68 CPU, 69 clock, 70 memory, 71 leakage detection device, and 73 an A/D converter.

BEST MODE FOR CARRYING OUT THE INVENTION

Embodiments of the present invention will be described below with reference to the accompanying drawings.

Figure 2:
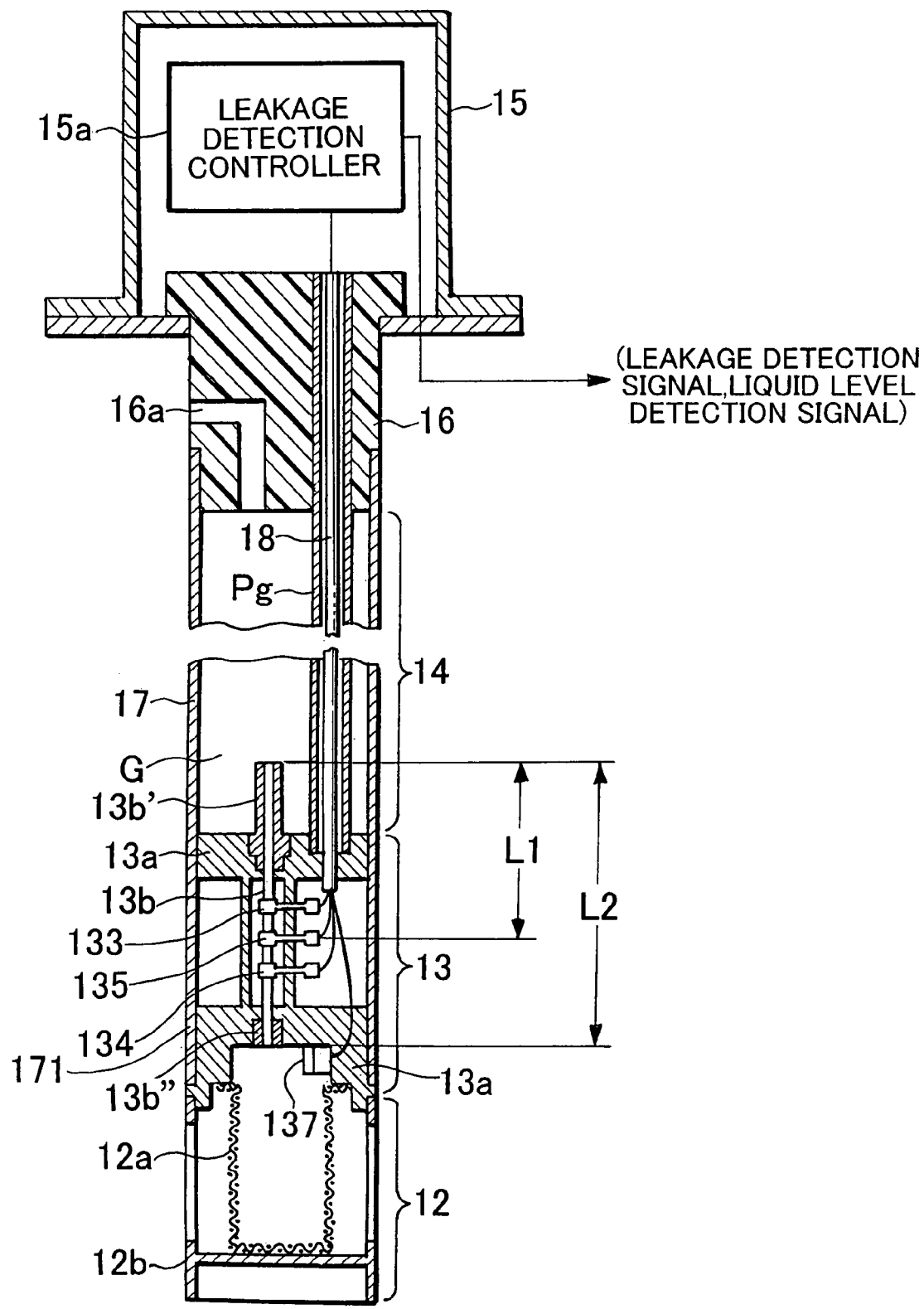
FIG. 2 is a partly omitted cross-sectional view showing the leakage detection device of FIG. 1.
Figure 3:
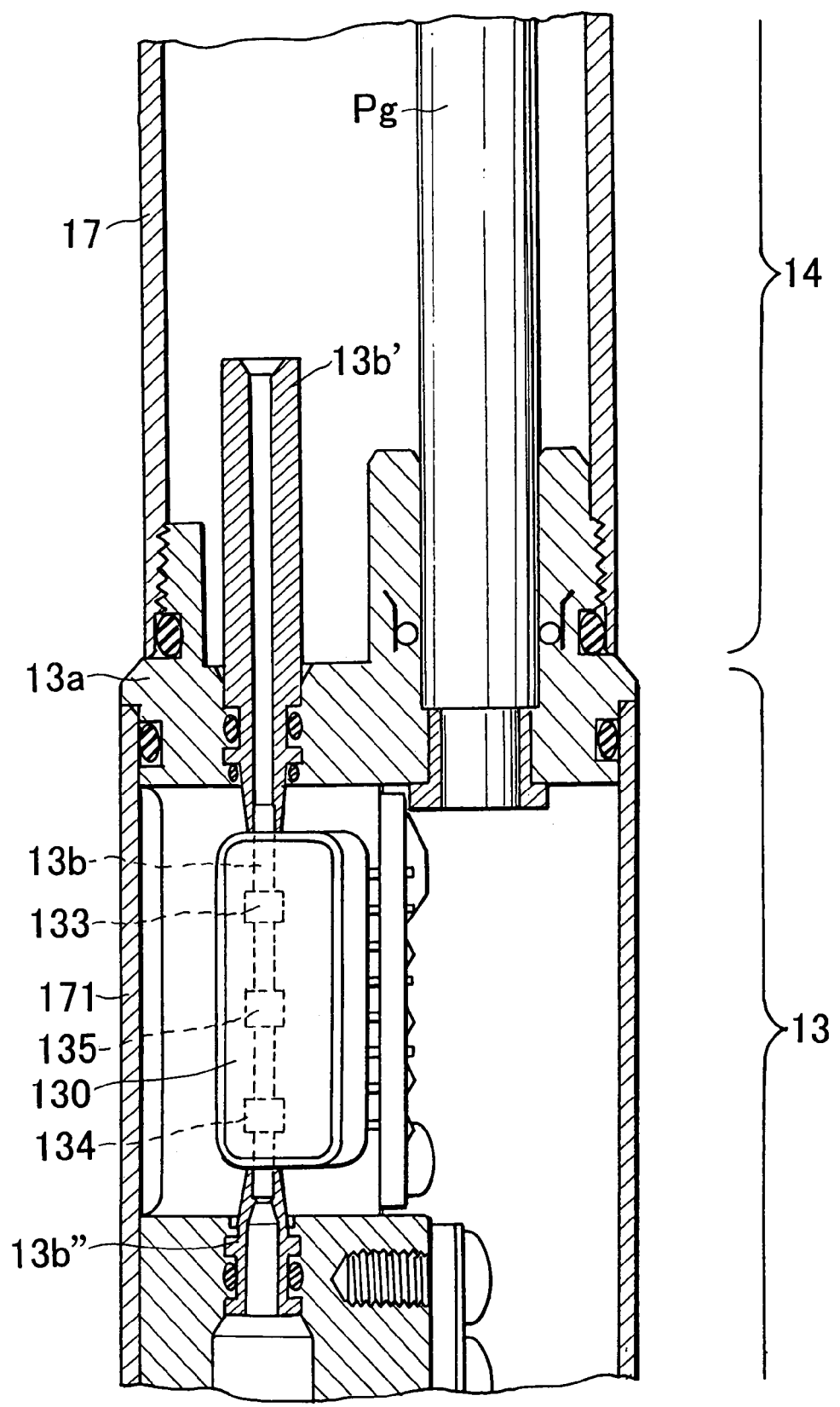
FIG. 3 is a partly enlarged view of FIG. 1.

FIG. 1 is a partly broken perspective view for explaining a device for detecting leakage of liquid in a tank according to an embodiment of the present invention. FIG. 2 is a partly omitted cross-sectional view showing the leakage detection device according to the present embodiment. FIG. 3 is a partly enlarged view of FIG. 2.

A tank 1 has: a top panel 2 in which a measurement port 5 and a liquid inlet 6 used when liquid is injected into the tank are formed; a side panel 3 in which a liquid supply port 7 used when liquid in the tank is supplied to the outside is formed; and a bottom panel 4. As shown in FIG. 1, liquid (flammable liquid having a low viscosity such as gasoline, jet fuel, or the like having a kinetic viscosity of about 1.2 mm²/S (20° C.)) L is contained in the tank 1. LS denotes a liquid surface.

A leakage detection device 11 is inserted in part into the tank 1 through the measurement port 5 formed in the top panel 2 of the tank 1 and is disposed in the vertical direction, as a whole. The leakage detection device 11 includes a liquid lead-in/lead-out section or liquid inlet/outlet 12, a flow rate measurement section 13, a liquid storage section or liquid pool section 14, a cap 16, and a circuit container 15. The liquid inlet/outlet 12, flow rate measurement section 13, and liquid pool section 14 are located inside the tank 1. The liquid surface LS is positioned within the height range of the liquid pool section 14. As shown in FIG. 3, the flow rate measurement section 13 includes a sheath pipe 171 extending over them in the vertical direction, and liquid pool section 14 includes a measurement tube or sheath pipe 17 extending over them in the vertical direction.

As shown in FIG. 2, a sensor holder 13a is disposed in the sheath pipe 171 in the flow rate measurement section 13. A measurement slim-pipe first portion 13b extending in the vertical direction is fixedly held by the sensor holder 13a. A first temperature sensor 133, a heater 135, and a second temperature sensor 134 are disposed in the measurement slim-pipe first portion 13b from above in the order mentioned and attached thereto. The heater 135 is equally spaced apart from the first and second temperature sensors 133 and 134. The outside of the sensor holder 13a is covered with the sheath pipe 171, thereby protecting the first temperature sensor 133, heater 135, and second temperature sensor 134 from being corroded by the liquid L.

The first temperature sensor 133, heater 135, and second temperature sensor 134 constitute a flow rate sensor section for measuring the flow rate of liquid in the measurement slim-pipe first portion 13b and are covered by a package 130, as shown in FIG. 3. The measurement slim-pipe first portion 13b is positioned inside the package 130 of the flow rate sensor section, and both upper and lower opening ends are protruded from the package 130. A measurement slim-pipe second portion 13b' is connected at its lower end to the upper opening end of the measurement slim-pipe first portion 13b. That is, the measurement slim-pipe second portion 13b' is attached at its lower end to the package 130 of the flow rate sensor section and protruded at its upper side inside a measurement pipe, i.e., a portion of the sheath pipe 17 forming the liquid pool section 14. A measurement slim-pipe third portion 13b" is connected at its upper end to the lower opening end of the measurement slim-pipe first portion 13b. That is, the measurement slim-pipe third portion 13b" is attached to the package 130 of the flow rate sensor section and communicates with the liquid inlet/outlet 12. The measurement slim-pipe constituted by the above first to third portions 13b to 13b" functions as a liquid distribution channel between the liquid pool section 14 and liquid inlet/outlet 12. With this configuration, the measurement pipe is considered to be connected to the upper end of the measurement-slim pipe or measurement fine tube in the present invention.

A pressure sensor 137 is attached to the sensor holder 13a at the portion near the lower end of the measurement slim-pipe third portion 13b" in the flow rate measurement section 13. The pressure sensor 137, which is for measuring the liquid level of liquid L in the tank, can be a piezo element or condenser type sensor and outputs an electrical signal corresponding to the liquid level, e.g., a voltage signal.

In the liquid inlet/outlet 12, as shown in FIG. 2, a filter cover 12b fixes a filter 12a to the lower portion of the sensor holder 13a. The filter 12a has a function of removing foreign substances such as sludge floated or deposited in the liquid in the tank and introducing only the liquid into the liquid pool section 14 through the measurement slim-pipe. An opening is formed in the side wall of the filter cover 12b, and the liquid L in the tank 1 is introduced into the measurement slim-pipe through the filter 12a of the liquid inlet/outlet 12.

The liquid pool section 14 is located above the flow rate measurement section 13 and has a space G surrounded by the sheath pipe 17. Liquid introduced through the measurement slim-pipe is pooled in the space G. The cap 16 is fixed at the upper portion of the sheath pipe 17 and has an air path 16a for communicating the space in the liquid pool section 14 with space in the tank 1 outside the detection device. The circuit container 15, which is attached to the cap 16, contains a leakage detection controller 15a. A guide pipe Pg extends in the sheath pipe 17 so as to connect the upper portion of the sensor holder 13a and cap 16 and, inside the guide pipe Pg, a wiring 18 extends so as to connect the first temperature sensor 133, heater 135, second temperature sensor 134, and pressure sensor 137 of the flow rate measurement section 13 with the leakage detection controller 15a, respectively.

The sheath pipe 17 in the liquid pool section 14 serves as a measurement pipe of the present invention. The cross-section area of the inside of the measurement slim-pipe, especially, that of the measurement slim-pipe first portion 13b is set much smaller (e.g., 1/50 or less, 1/100 or less, or 1/300-fold or less) than that of the sheath pipe 17 (excluding the outer cross-section area of the guide pipe Pg). This configuration allows liquid distribution in the measurement slim-pipe, especially, in the measurement slim-pipe first portion 13b to be measurable even in the case of a slight liquid leakage accompanied by a slight liquid level variation. The cross-section area of the inside of the measurement slim-pipe first portion 13b is set to in the range of e.g., from 0.75 mm$^2$ to 5 mm$^2$. The cross-section area of the inside of each of the measurement slim-pipe second portion 13b' and measurement slim-pipe third portion 13b" can be set to a value equivalent to that of the measurement slim-pipe first portion 13b.

It is preferable that the measurement slim-pipe, sheath pipes 17 and 171, sensor holder 13a, filter cover 12b, cap 16, and guide pipe Pg be made of metal having a heat expansion coefficient approximate to that of a material constituting the tank 1 and be made of the same metal as the material of the tank 1, such as casting iron or stainless steel.

Figure 4:
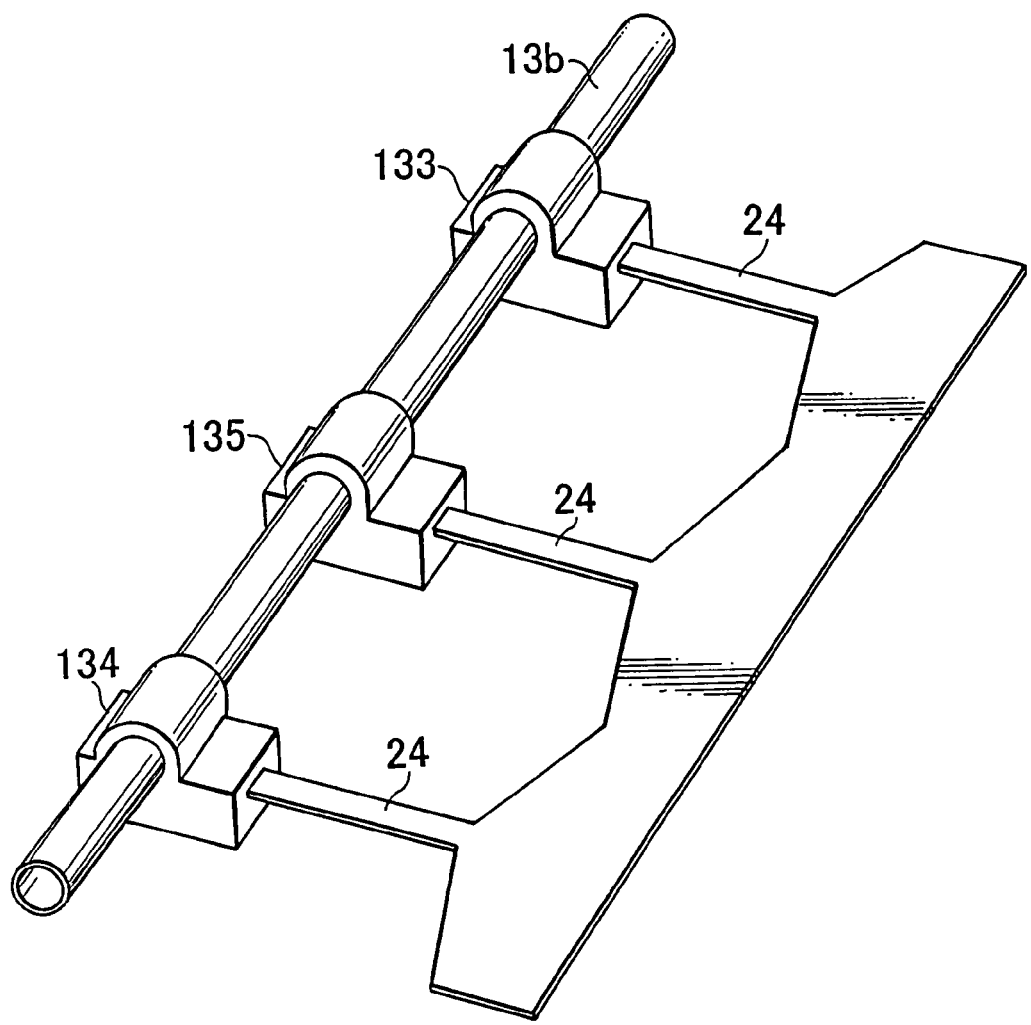
FIG. 4 is an enlarged perspective view showing a part where a first temperature sensor, heater, and second temperature sensor are attached to a measurement slim-pipe.
Figure 5:
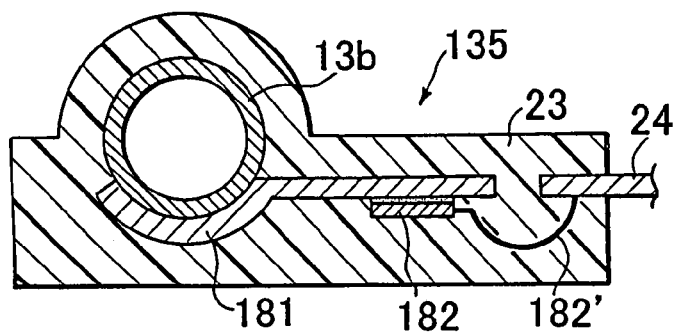
FIG. 5 is a cross-sectional view of FIG. 3.

FIG. 4 is an enlarged perspective view showing a part where the first temperature sensor 133, heater 135, and second temperature sensor 134 are attached to the measurement slim-pipe, and FIG. 5 is a cross-sectional view of FIG. 4. The heater 135 has a heat transfer member 181 brought into contact with the outer surface of the measurement slim-pipe first portion 13b and a thin-film heating element 182 stacked on the heat transfer member 181 through a dielectric thin-film. The thin-film heating element 182 is formed in a predetermined pattern. A wiring 182' is connected to the electrode of the thin-film heating element 182 for current application to the thin-film heating element 182. The heat transfer member 181 is made of metal or alloyed metal having a thickness of, e.g., about 0.2 mm and width of 2 mm. The wiring 182' is connected to a wiring (not shown) formed on a wiring board 24 such as a flexible wiring board. The latter wiring is connected to the above wiring 18 in the guide pipe Pg. The heat transfer member 181, thin-film heating element 182, and wiring 182' are sealed by a plastic sealing member 23 together with a part of the wiring board 24 and a part of the measurement slim-pipe first portion 13b. The first and second temperature sensors 134 and 134 have substantially the same configuration as that of the heater 135. Only a different point is that a thin-film temperature-sensitive element is used in the first and second temperature sensors 133 and 134 in place of the thin-film heating element in the heater 135.

The leakage detection device 11 having the configuration described above is attached to the measurement port 5 of the tank 1. Then, the liquid surface LS is positioned in the height range of the liquid pool section 14, as described above. Accordingly, the pressure sensor 137 is immersed in the liquid L in the tank filtered by the filter 12a of the liquid inlet/outlet 12. Then, the liquid L rises through the measurement slim-pipe third portion 13b", measurement slim-pipe first portion 13b and measurement slim-pipe second portion 13b' of the flow rate measurement section 13 and introduced into the space G of the liquid pool section 14, with the result that the surface of the liquid in the liquid pool section 14 reaches the same height position (which is a position higher than the upper end of the measurement slim-pipe second portion 13b') as the liquid surface LS in the tank outside the leakage detection device. When the liquid surface LS varies, the surface of the liquid in the liquid pool section 14 correspondingly varies to cause liquid flow in the measurement slim-pipe in association with this liquid surface variation, i.e., liquid level variation.

Figure 6:
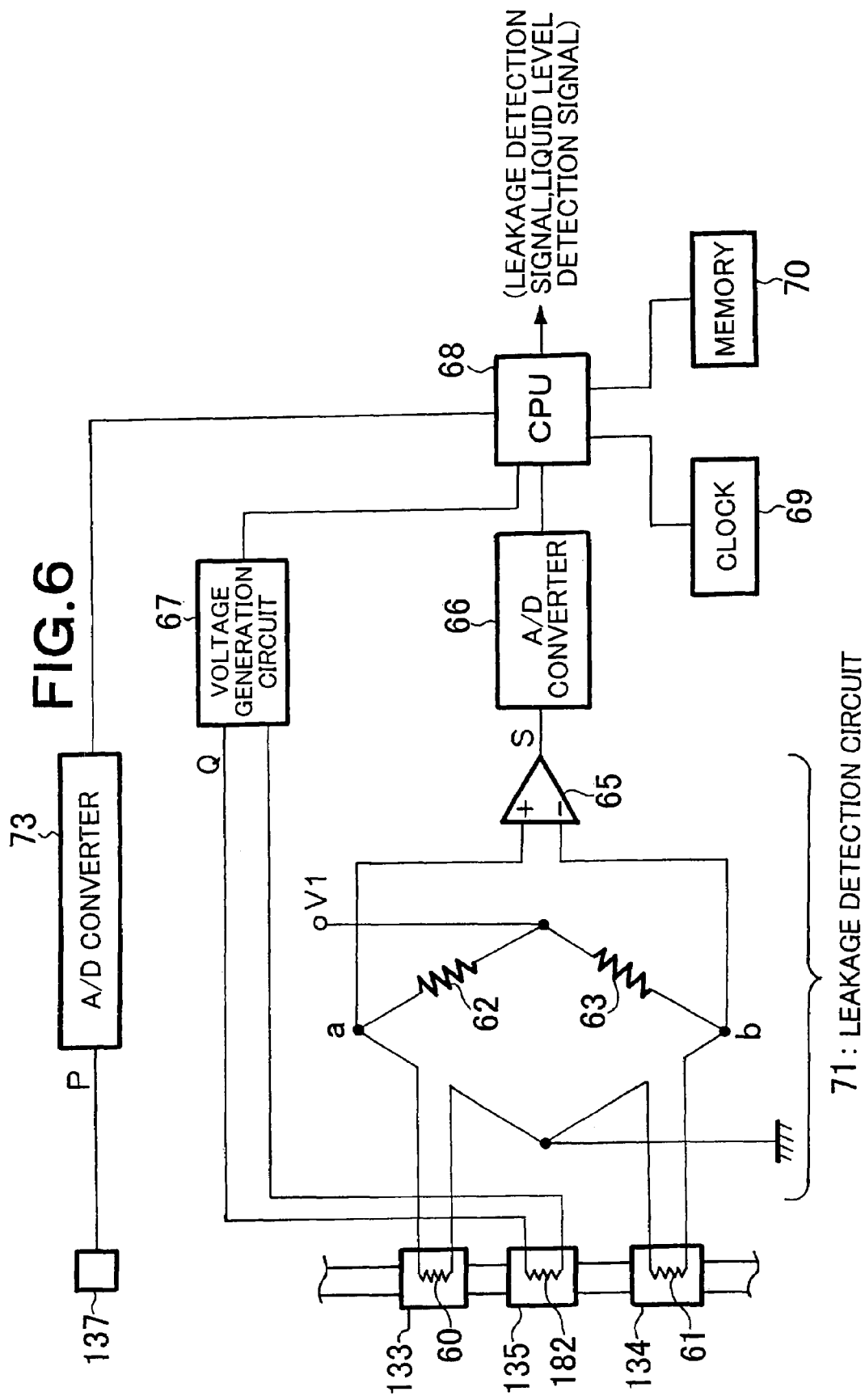
FIG. 6 is a view showing a circuit configuration of the flow rate sensor section, pressure sensor, and leakage detection controller.

FIG. 6 is a view showing a circuit configuration of the flow rate sensor section, pressure sensor, and leakage detection controller. As a power source for the circuits, a not-shown battery disposed in the circuit container 15 can be used.

The thin-film heating element 182 of the heater 135 is connected to a voltage generation circuit 67. In the present embodiment, a pulse voltage generation circuit is used as the voltage generation circuit 67. A single pulse voltage is timely applied from the pulse voltage generation circuit to the thin-film heating element 182. Thin-film temperature sensitive elements 60 and 61 respectively constituting the first and second temperature sensors 133 and 134 are connected to a leakage detection circuit 71. That is, the thin-film temperature sensitive elements 60 and 61 constitute a bridge circuit together with resistors 62 and 63. A supply voltage V1 is supplied to the bridge circuit, and a voltage output signal corresponding to a potential difference between points a and b can be obtained by a differential amplifier 65. The output of the leakage detection device 71, which corresponds to a difference in temperature sensed by the thin-film temperature sensitive elements 60 and 61 of the temperature sensors 133 and 134, is input to a CPU 68 through an A/D converter 66. The pulse voltage generation circuit 67 operates under the control of the CPU 68. The output of the pressure sensor 137 is input to the CPU 68 through an A/D converter 73. A clock 69 and a memory 70 are connected to the CPU.

Leakage detection operation, i.e., operation of the CPU 68 in the present embodiment will be described below.

Figure 7:
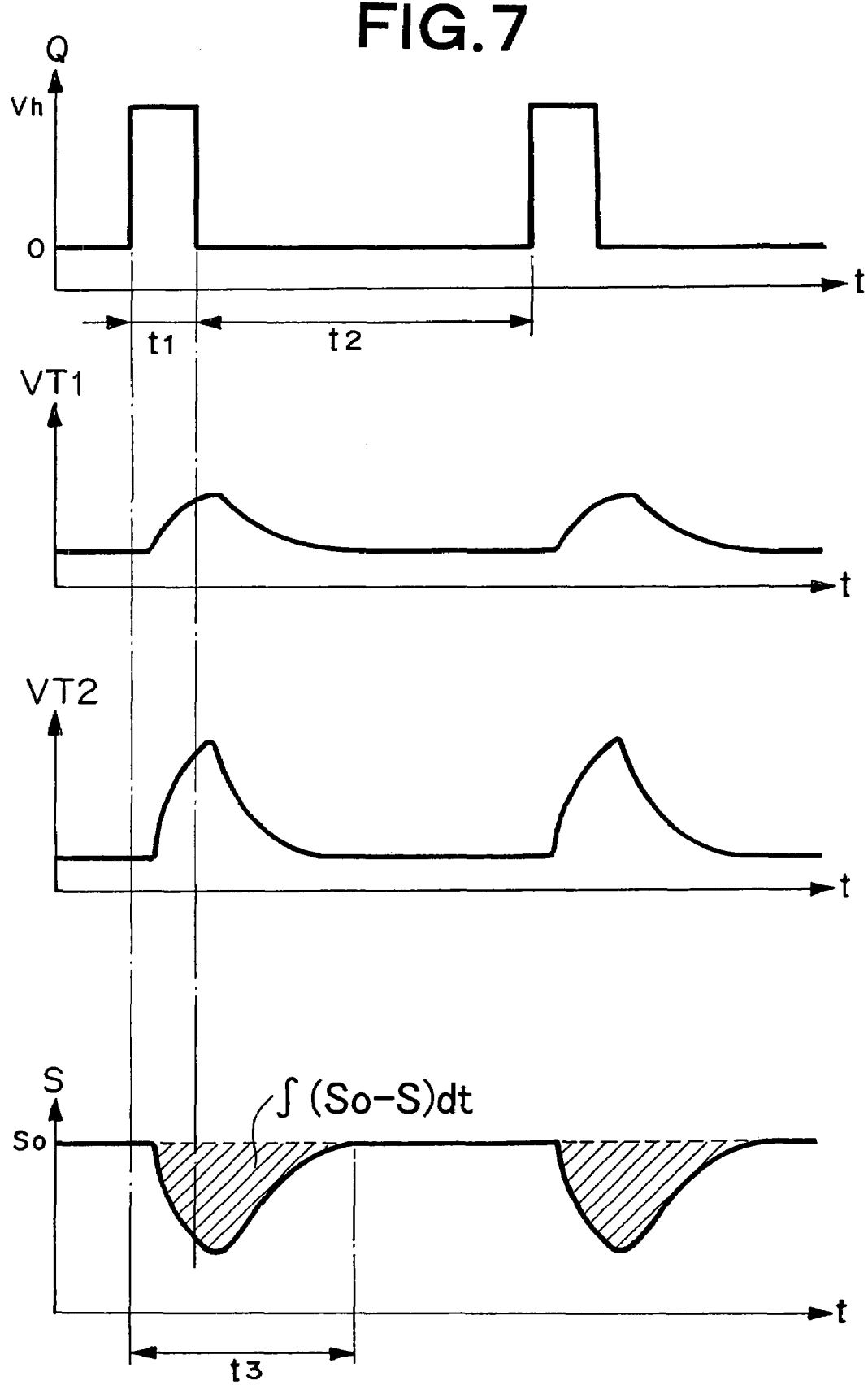
FIG. 7 is a timing chart showing a relationship between a voltage Q to be applied to a thin-film heating element and a voltage output S of a leakage detection circuit.

FIG. 7 is a timing chart showing a relationship between an voltage Q to be applied from the pulse voltage generation circuit 67 to the thin-film heating element 182 and a voltage output S of the leakage detection circuit 71. A single pulse voltage having a time width t1 is applied from the CPU 68 at a predetermined time interval t2 according to the clock 69. In this case, for example, the pulse width t1 corresponds to 2 to 10 seconds, and a pulse height Vh corresponds to 1.5 to 4 V. The above voltage application causes heat in the thin-film heating element 182. The heat then heats the measurement slim-pipe first portion 13b and liquid inside the measurement slim-pipe first portion 13b and is, thereby, transmitted to the surrounding area. Influence of the heat reaches the thin-film temperature sensitive elements 60 and 61 to thereby vary the temperature of the thin-film temperature sensitive elements. Assuming that the flow rate of liquid in the measurement slim-pipe first portion 13b is 0, the temperatures in the two temperature sensitive elements 60 and 61 equally vary, if contribution of natural convection flow to the heat transfer is ignored. However, in the case where the surface of liquid in the tank is lowered due to, e.g., leakage of liquid in a tank, the liquid is moved downward from the liquid pool section 14 to the measurement slim-pipe 13b and is then withdrawn into the tank 1 outside the detection device through the liquid inlet/outlet 12. That is, the liquid in the measurement slim-pipe 13b flows downward. It follows that the heat from the thin-film heating element 182 is transferred easier to the thin-film temperature sensitive element 61 of the lower side temperature sensor 134 than to the thin-film temperature sensitive element 60 of the upper side temperature sensor 133. As a result, a difference occurs between the temperatures that the two thin film temperature sensitive elements detect, making resistance variation of the thin-film temperature sensitive elements different from each other. FIG. 7 shows a variation in a voltage VT1 to be applied to the thin-film temperature sensitive element 60 of the temperature sensor 133 and a variation in a voltage VT2 to be applied to the thin-film temperature sensitive element 61 of the temperature sensor 134. As a result, the output of the differential amplifier, i.e., the voltage output S of the leakage detection circuit 71 varies as shown in FIG. 7.

Figure 8:
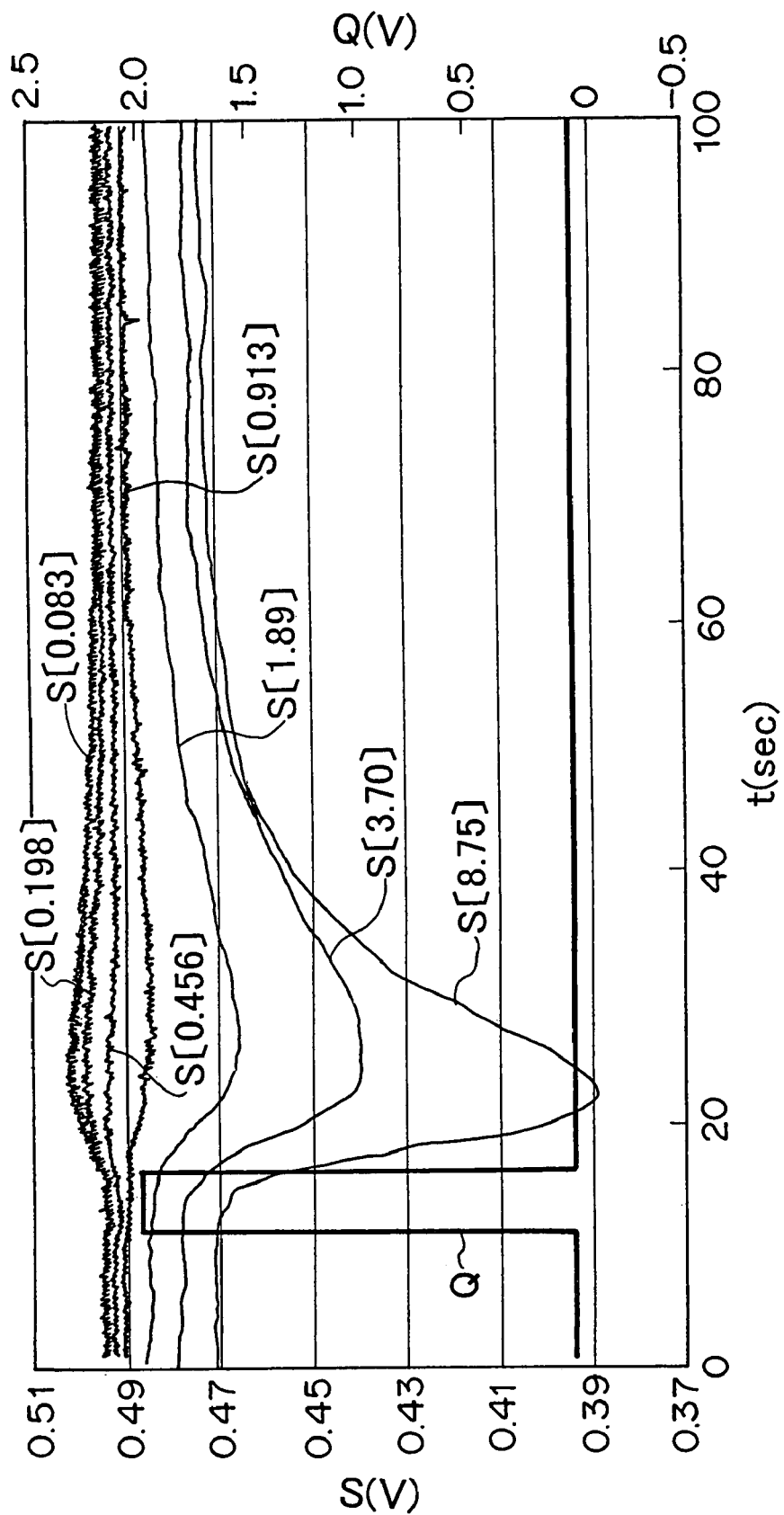
FIG. 8 is a view showing a concrete example of a relationship between the voltage Q applied to the thin-film heating element and voltage output S of the leakage detection circuit.

FIG. 8 shows a concrete example of a relationship between the voltage Q applied from the pulse voltage generation circuit 67 to the thin-film heating element 182 and voltage output S of the leakage detection circuit 71. In this example, a single pulse voltage has a pulse height Vh corresponding to 2 V and a pulse width t1 corresponding to 5 seconds, and a liquid level variation speed F [mm/h] is varied to obtain a voltage output S [F].

When the pulse voltage generation circuit 67 starts applying the single pulse voltage to the thin-film generating element 182 of the heater 135, the CPU 68 integrates a difference $(S_0-S)$ between the voltage output S of the leakage detection circuit and its initial value (i.e., value obtained at the single pulse voltage application start time) $S_0$ for a predetermined time period t3 after the start of the single pulse voltage application. The integrated value $\int(S_0-S)dt$ corresponds to the area marked with diagonal lines in FIG. 7 and to a value equivalent to the flow rate of liquid in the measurement slim-pipe first portion 13b. The predetermined time period t3 corresponds to, e.g., 20 to 150 seconds.

Figure 9:
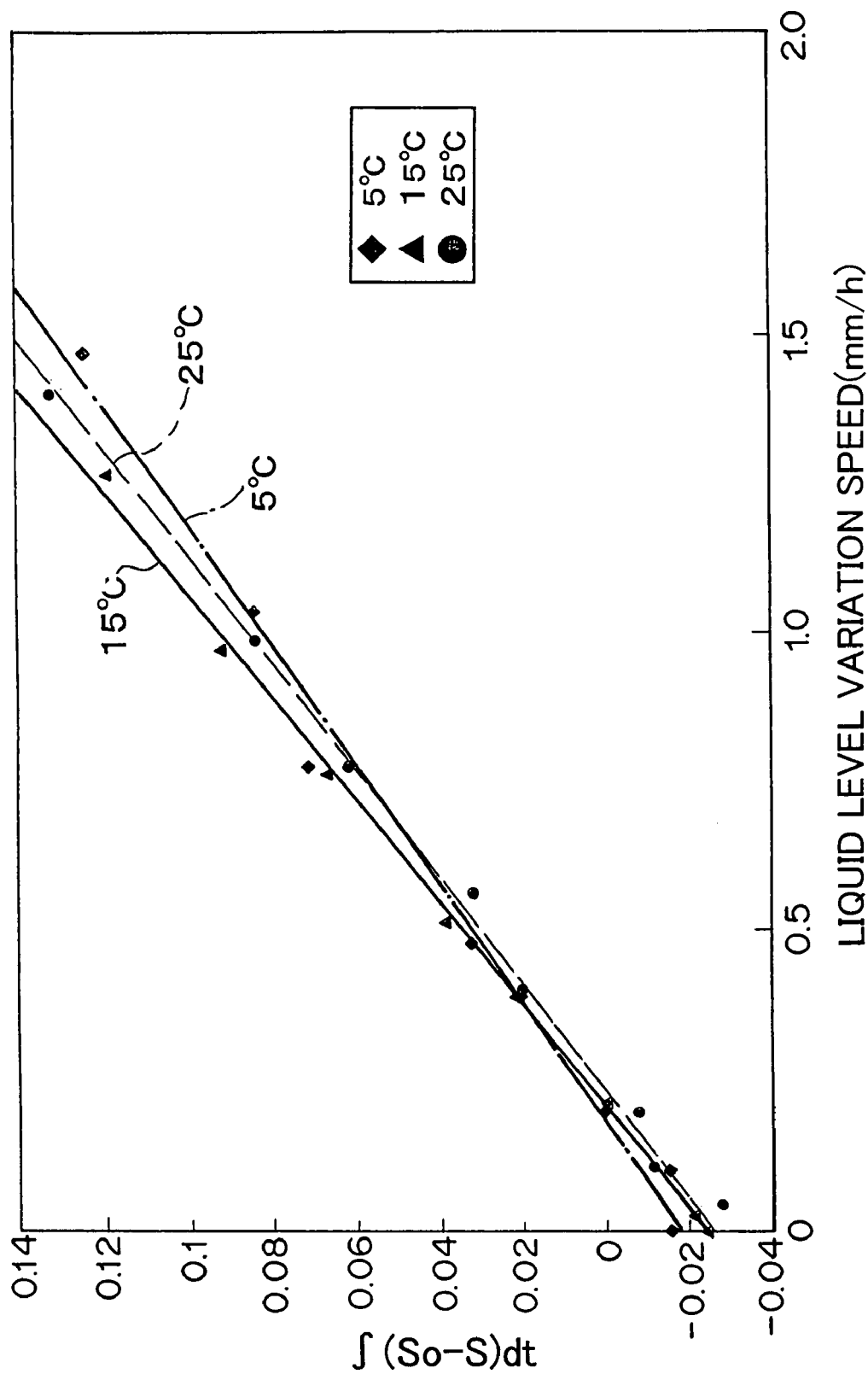
FIG. 9 is a view showing a concrete example of a relationship between liquid level variation speed and an integrated value $\int(S_0-S)dt$.

FIG. 9 shows a concrete example of a relationship between the liquid level variation speed corresponding to the liquid flow rate F in the measurement slim-pipe first portion 13b and above integrated value $\int(S_0-S)dt$. In this example, the predetermined time period t3 for obtaining the integrated value is set to 30 seconds, and relations are obtained for three different temperatures. It can be seen from FIG. 9 that a favorable linear relationship exists between the liquid level variation speed and integrated value $\int(S_0-S)dt$ in the region where the liquid level variation speed is set to 1.5 mm/h or less, irrespective of the set temperature. While a favorable linear relationship is represented in the region where the liquid level variation speed is set to 1.5 mm/h or less, it is possible to obtain a favorable linear relationship in the region where the liquid level variation speed is set to 20 mm/h or less by appropriately setting a ratio of the cross-section area of the inside of the measurement slim-pipe first portion relative to that of the measurement pipe or the length of the measurement slim-pipe.

Such a typical relationship between the integrated value $\int(S_0-S)dt$ and liquid level variation speed can be previously stored in the memory 70. Therefore, it is possible to obtain leakage of liquid in the tank as a liquid level variation speed by referring to the stored data in the memory 70 according to the integrated value $\int(S_0-S)dt$ corresponding to a value equivalent to the flow rate calculated using the output of the leakage detection circuit 71 to perform conversion. However, in the case where a liquid level variation speed smaller then a given value (e.g., 0.01 mm/h) is obtained, it is possible to determine that the variation is not due to leakage but to a measurement error.

The leakage detection operation described above is first leakage operation. The first leakage detection operation is repeatedly performed at an appropriate time interval t2. The time interval t2 corresponds to, e.g., 40 seconds to 5 minutes (t2 needs to be larger than integration time period t3).

Further, when receiving an output P equivalent to liquid level which is input from the pressure sensor 137 through the A/D converter 73, the CPU can immediately convert it into a liquid level p. While the value of the liquid level p is based on the height of the pressure sensor 137, it is possible to convert the value into the liquid level value with respect to the height of the tank itself by taking into account the vertical position of the measurement port 5 of the tank 1 and distance from the attachment part of the leakage detection device to the measurement port 5 to pressure sensor 137. A liquid level detection signal indicating results of the liquid level detection is output from the CPU 68.

The CPU 68 stores the value of the liquid level p in the memory 70 at a constant time interval tt of e.g., 2 to 10 seconds, calculates a difference between the current value and previous value for each storage operation, and stores the difference in the memory 70 as a value of liquid level variation rate p' with respect to time.

Figure 10:
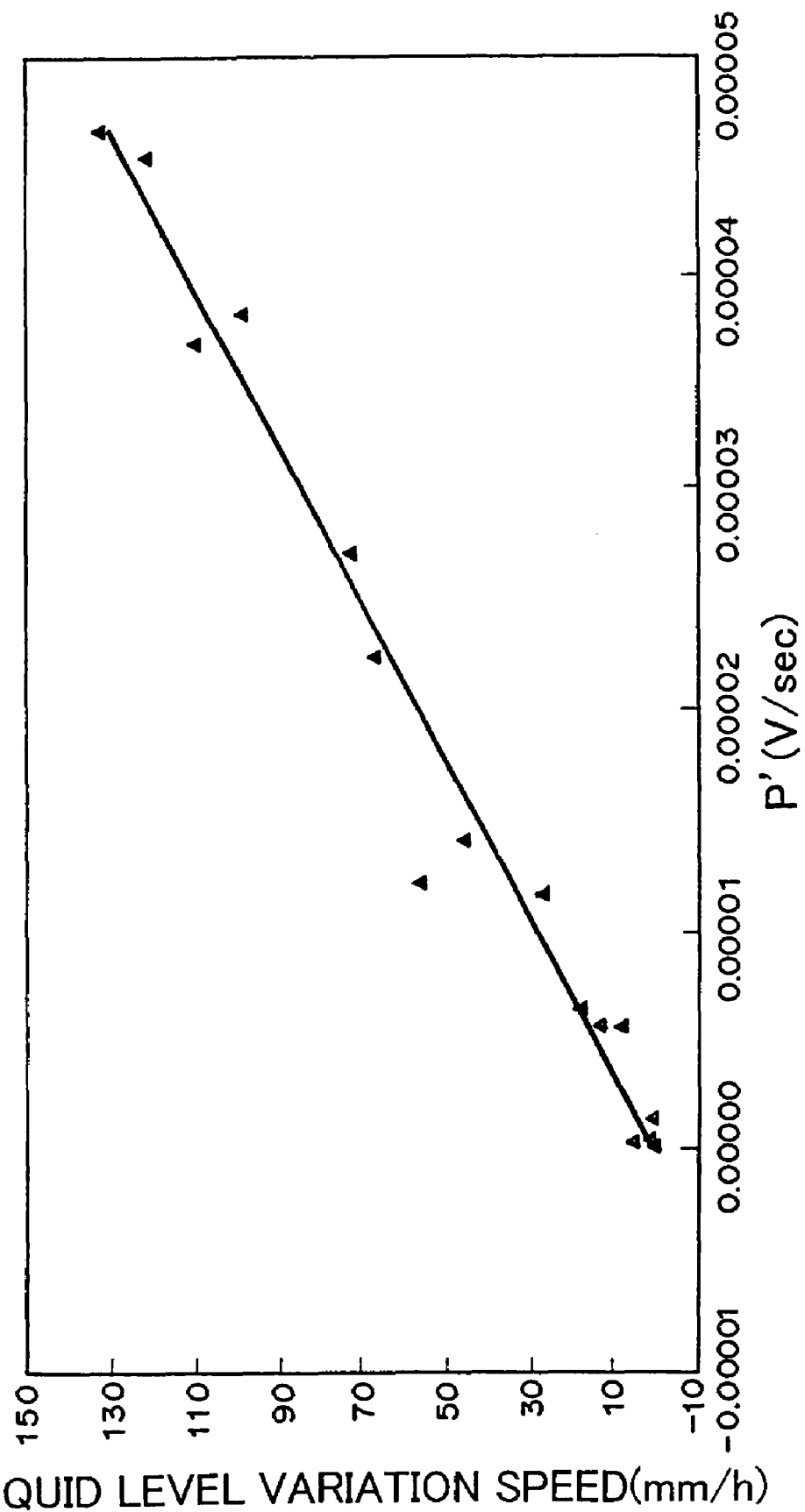
FIG. 10 is a view showing a concrete example of a relationship between the liquid level variation speed and variation rate P' with respect to time of the output equivalent to liquid level.

FIG. 10 shows a concrete example of a relationship between the liquid level variation speed and variation rate P' with respect to time of the output P equivalent to liquid level. It can be seen from FIG. 10 that a favorable linear relationship exists between the liquid level variation speed and variation rate P' with respect to time of the output P equivalent to liquid level in the region where the liquid level variation speed is set to 150 mm/h or less. This reveals that the liquid level variation speed and liquid level variation rate p' with respect to time favorably correlate with each other. While a favorable linear relationship is represented in the region where the liquid level variation speed is set to 150 mm/h or less, it is possible to obtain a favorable linear relationship in the region where the liquid level variation speed is set up to 200 mm/h.

Therefore, it is possible to obtain leakage of liquid in the tank as a magnitude of the variation rate p' with respect to time of the liquid level p measured by the pressure sensor 137.

The above second leakage detection can cover wider range of liquid level variation speed than the first leakage detection does. On the other hand, the first leakage detection can measure a minute liquid level variation speed region with higher accuracy than the second leakage detection does.

A liquid level variation in the tank 1 occurs also when liquid is injected into the tank through the liquid inlet 6 or when liquid is supplied to the outside through the liquid supply port 7. However, the climbing or descending speed of liquid level in the tank 1 obtained in the above case is generally considerably larger than the liquid level variation speed or liquid level variation rate with respect to time obtained in the case where leakage occurs.

In light of the above, the CPU 68 performs the following processing for leakage in the present embodiment.

(1) In the case where the magnitude of the liquid level variation rate p' with respect to time falls within a predetermined range (e.g., 10 to 100 mm/h) in the second leakage detection, the CPU 68 outputs a result of the second leakage detection as a leakage detection signal.

(2) In the case where the magnitude of the liquid level variation rate p' with respect to time falls below the predetermined range (e.g., smaller than 10 mm/h) in the second leakage detection, the CPU 68 outputs a result of the first leakage detection as a leakage detection signal.

(3) In the case where the magnitude of the liquid level variation rate p' with respect to time falls above the predetermined range (e.g., larger than 100 mm/h) in the second leakage detection, the CPU 68 determines that the variation is due to causes (e.g., liquid injection or liquid supply) other than leakage and does not output a leakage detection signal.

Further, in the present embodiment, in the case where the situation as described in (3) occurs, i.e., in the case where the magnitude of the liquid level variation rate p' with respect to time falls above the predetermined range in the second leakage detection, the CPU 68 can stop the first leakage detection during subsequent predetermined time periods tm. It is preferable that the predetermined time period tm be set to a time length slightly longer than the time needed for liquid surface LS to become flat after liquid is injected into the tank from outside or liquid is supplied from the tank to outside. For example, the predetermined time period tm can be set to a value ranging from 10 to 60 minutes. Particularly, during the predetermined time period tm, the CPU 68 can stop operations of the pulse voltage generation circuit 67 and leakage detection circuit 71, resulting in a reduction in power consumption.

The liquid level variation speed or liquid level variation rate with respect to time correlates with a leakage amount (leakage amount per unit time). That is, a value obtained by multiplying the liquid level variation speed or liquid level variation rate with respect to time by the horizontal cross-section area inside the tank obtained at a height position corresponding to the liquid level corresponds to the leakage amount of liquid. Therefore, it is possible to obtain the amount of leakage of liquid in the tank based on the liquid level and leakage (liquid level variation speed or liquid level variation rate p' with respect to time) detected as described above by previously storing the shape or size (i.e., relationship between the height position and horizontal cross-section inside the tank) in the memory 70 and referring to the stored data in the memory 70.

In the case where the tank has a vertical cylindrical shape as shown in FIG. 1, i.e., the horizontal cross-section inside the tank is constant irrespective of the vertical position, a simple proportional relationship is established between the liquid level variation speed or liquid level variation rate with respect to time and leakage amount. Therefore, it is possible to easily calculate the leakage amount by multiplying the liquid level variation speed or liquid level variation rate with respect to time by a proportional constant corresponding to the horizontal cross-section inside the tank without relation to the liquid level value itself. That is, in this case, leakage detected by the device of the present invention is substantially equal to a value obtained based on the leakage amount.

In the above embodiment, as shown in FIG. 2, the dimension of the measurement slim-pipe is set such that a distance L1 between the position corresponding to the heater 135 and the upper opening end (upper end of the second portion 13*b*') of the measurement slim-pipe becomes a value in the range of 20 mm to 45 mm. Further an entire length L2 (distance between the lower opening end of the third portion 13*b*" and upper end of the second portion 13*b*') of the measurement slim-pipe is set to a value in the range of 30 mm to 65 mm.

As described above, the dimension of the measurement slim-pipe is set such that the distance L1 between the position corresponding to the heater 135 and the upper end of the measurement slim-pipe becomes 20 mm or more in the present embodiment. Thus, even in the case where the liquid in the tank has a comparatively low kinetic viscosity of 1.5 $mm^2/S$ (20° C.) or less like that of gasoline, jet fuel, or the like, the convection flow in the measurement slim-pipe becomes weaker due to a pressure loss occurring in the measurement slim-pipe, especially, on the upper side relative to the heater 135 even when the liquid in the measurement slim-pipe is heated by the heater. Therefore, influence of the convection flow on the flow rate measurement can be ignored, so that it is possible to detect extremely small amount of leakage without deteriorating the detection accuracy. Further, the distance L1 between the position corresponding to the heater 135 and the upper end of the measurement slim-pipe is set to 45 mm or less in the present embodiment as described above. This configuration prevents the pressure loss from being excessively increased and secures an adequate liquid level range within which the leakage can be detected, enabling a favorable leakage detection.

Further, the length L2 of the measurement slim-pipe is set to 30 mm or more in the present embodiment. Thus, even in the case where the liquid in the tank has a comparatively low kinetic viscosity, the convection flow in the measurement slim-pipe becomes weaker due to a pressure loss occurring in the measurement slim-pipe. Therefore, influence of the convection flow on the flow rate measurement can be ignored, so that it is possible to detect extremely small amount of leakage without deteriorating the detection accuracy. Further, the length L2 of the measurement slim-pipe is set to 65 mm or less in the present embodiment as described above. This configuration prevents the pressure loss from being excessively increased and secures an adequate liquid level range within which the leakage can be detected, enabling a favorable leakage detection.

Figure 11:
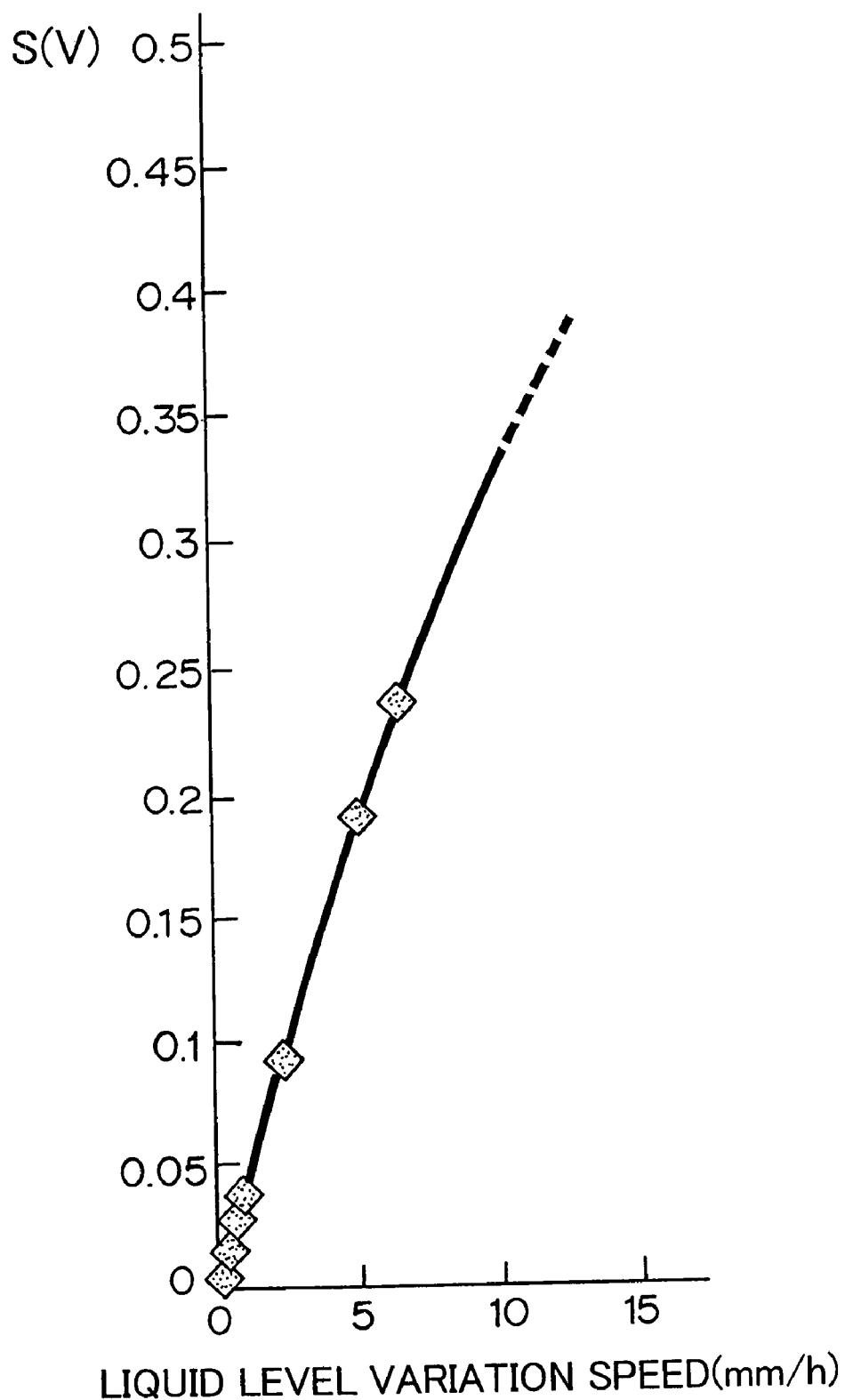
FIG. 11 is a view showing a calibration curve for converting the voltage output S of the leakage detection circuit.

FIG. 11 shows an experiment result concerning a difference in the influence of the convection flow on the flow rate measurement between the present embodiment and a comparison example outside the scope of this invention. FIG. 11A shows an experiment result according to the present invention. In this experiment, L1 was set to 36.5 mm, L2 was to 50.5 mm, and cross-section areas of the inside of the measurement slim-pipe first to third portions 13b to 13b" were to 0.95 mm$^2$. Gasoline was used as liquid to be measured. The curve of FIG. 11A is a voltage output (V) obtained as the time-average value (each 300 seconds) of the integrated value $\int(S_0-S)dt$ under the condition that there is no leakage of liquid from the tank and therefore there is no variation in the liquid level. As can be seen from the curve of FIG. 11A, the voltage output varies little. FIG. 11B shows an experiment result according to the comparison example. In this experiment, the length of the measurement slim-pipe second portion was reduced by 22 cm compared to that of the present embodiment so that the measurement slim-pipe second portion was not protruded into the measurement pipe. That is, L1 was set to 14.5 mm and L2 was to 28.5 mm. Other values were set to the same values as in the experiment according to the present embodiment. The curve of FIG. 11B is, as in the case of the experiment according to the present embodiment, a voltage output (V) obtained as the time-average value (each 300 second) of the integrated value $\int(S_0-s)dt$ under the condition that there is no leakage of liquid from the tank and therefore there is no variation in the liquid level. As can be seen from the curve of FIG. 11B, the voltage output varies more widely than in the case of the experiment according to the present embodiment, which is likely to be a factor deteriorating the leakage detection accuracy.

While a pulse voltage generation circuit is used as the voltage generation circuit 67 in the above embodiment, it is also possible to use, as the voltage generation circuit 67, a constant voltage generation circuit that applies a constant voltage (i.e., a constant direct voltage) to the heater 135. Hereinafter, another embodiment in which such a constant voltage generation circuit is used will be described.

In the present embodiment, a constant direct voltage Q is applied from a constant voltage generation circuit used as the voltage generation circuit 67 of FIG. 6 to the thin-film heating element 182 of the heater 135. As a result, the heater 135 remains in a constant heat generating state. Part of the heat is transmitted to liquid in the measurement slim-pipe 13b through the heat transfer member 181 so as to be used as a heat source for heating the liquid.

Assuming that liquid is not distributed in the measurement slim-pipe, i.e., the flow rate of liquid in the measurement slim-pipe is 0, the temperature detected by the first and second temperature sensors 133 and 134 is substantially the same, if contribution of natural convection flow to the heat transfer is ignored. However, when liquid distribution occurs in the measurement slim-pipe 13b, the heat from the heater 135 is transferred easier to the downstream side than to upstream side. As a result, a difference occurs between the temperatures that the first and second temperature sensors 133 and 134 detect. Since a voltage output corresponding to the difference between the temperatures detected by the first and second temperature sensors 133 and 134 corresponds to the liquid flow rate, the obtained voltage output can be set as a flow rate value output. That is, potentials at points a and b of the bridge circuit of the leakage detection circuit 71 are input to the differential amplifier 65. It is possible to obtain, from the differential amplifier, a voltage output S corresponding to the difference between the temperatures detected by the first and second temperature sensors 133 and 134 by appropriately setting resistance values of the resistors 62 and 63 of the bridge circuit in advance.

In the manner as described above, a flow rate measurement based on temperature difference between two fixed points is performed. In the flow rate measurement based on temperature difference between two fixed points according to the present invention, a value equivalent to the flow rate is obtained based on a temperature difference (actually, a difference in electrical characteristics corresponding to the detected temperature difference) detected by the first and second temperature sensors disposed on the upstream and down stream sides of the heater.

Leakage detection operation, i.e., operation of the CPU 68 in the present embodiment will next be described. The operation of the CPU 68 in the present embodiment is the same as that in the above embodiment described with reference to FIGS. 1 to 11 except for the operation of the first leakage detection.

The CPU 68 uses a stored calibration curve to convert the output voltage S into a corresponding flow rate value. FIG. 12 is a view showing an example of the calibration curve for the conversion of S. As shown in FIG. 12, a favorable linear relationship exists between the liquid level variation speed and voltage output S in the region where the liquid level variation speed corresponding to a flow rate value is set to, e.g., 10 mm/h or less. Therefore, the same processing as that performed in the above embodiment described with reference to FIGS. 1 to 11 can be performed for leakage detection.

The present embodiment has an advantage that a calculation made by the CPU 68 for obtaining the value equivalent to the flow rate in the first leakage detection becomes easier than the calculation performed in the above embodiment described with reference to FIGS. 1 to 11.

Figure 12A:
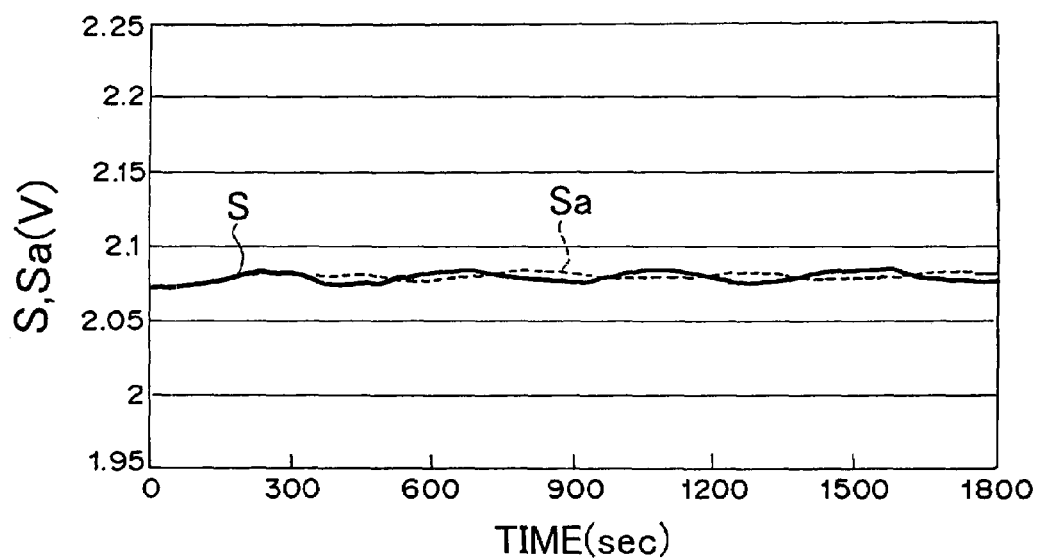
FIGS. 12A and 12B show experiment results of an embodiment of the present invention and a comparison example outside the scope of the present invention.
Figure 12B:
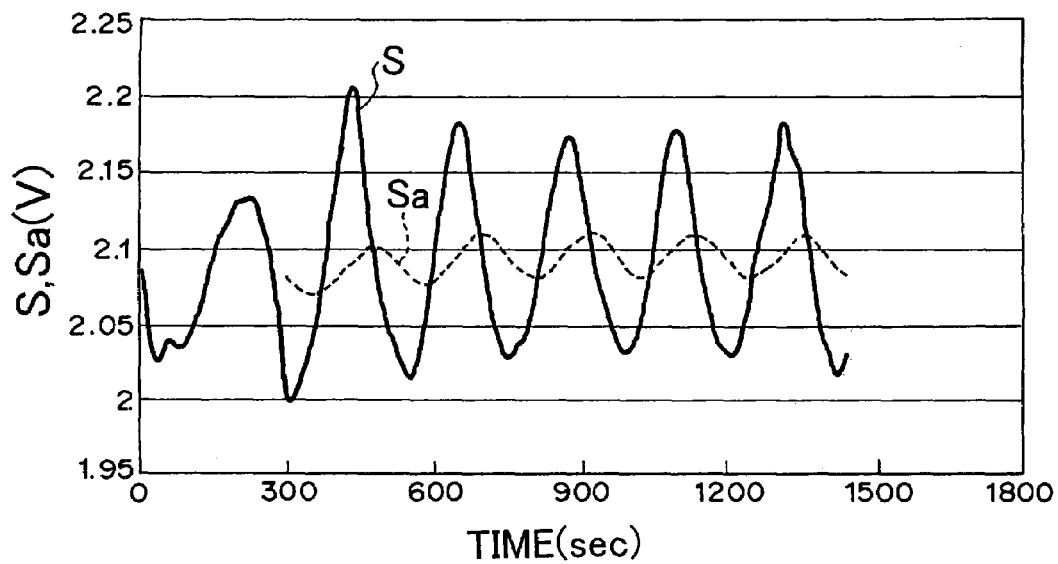

FIG. 12 shows an experiment result concerning a difference in the influence of the convection flow on the flow rate measurement between the present embodiment and a comparison example outside the scope of this invention. FIG. 12A shows an experiment result according to the present invention. In this experiment, L1 was set to 36.5 mm, L2 was to 50.5 mm, and cross-section areas of the inside of the measurement slim-pipe first to third portions 13b to 13b" were to 0.95 mm$^2$. Gasoline was used as liquid to be measured. The curves of FIG. 12A are the voltage output S and average voltage output Sa obtained as the time-average value of each 300 second under the condition that there is no leakage of liquid from the tank and therefore there is no variation in the liquid level. As can be seen from the curve of FIG. 12A, the S and Sa vary little. FIG. 12B shows an experiment result according to the comparison example. In this experiment, the length of the measurement slim-pipe second portion was reduced by 22 cm compared to that of the present embodiment so that the measurement slim-pipe second portion was not protruded into the measurement pipe. That is, L1 was set to 14.5 mm and L2 was to 28.5 mm. Other values were set to the same values as in the experiment according to the present embodiment. The curves of FIG. 12B is, as in the case of the experiment according to the present embodiment, the voltage output S and average voltage output Sa obtained as the time-average value of each 300 seconds under the condition that there is no leakage of liquid from the tank and therefore there is no variation in the liquid level. As can be seen from the curve of FIG. 12B, the S and Sa vary more widely than in the case of the experiment according to the present embodiment, which is likely to be a factor deteriorating the leakage detection accuracy.

What is claimed is:

1. A device for detecting leakage of liquid in a tank, comprising:
    a measurement slim-pipe into/from the lower end of which the liquid in a tank is injected or discharged;
    a measurement pipe connected to the upper end of the measurement slim-pipe and having a cross-section area larger than that thereof;
    a flow rate sensor section which is additionally provided to the measurement slim-pipe and which is used for measuring the flow rate of the liquid in the measurement slim-pipe,
    wherein the flow rate sensor section includes a heater and a temperature sensor, and the dimension of the measurement slim-pipe is set such that a distance between the position corresponding to the heater of the measurement slim-pipe and the upper opening end thereof becomes a value in the range of 20 mm to 45 mm.

2. The device for detecting leakage of liquid in a tank as claimed in claim 1, wherein the length of the measurement slim-pipe is set to a value in the range of 30 mm to 65 mm.

3. The device for detecting leakage of liquid in a tank as claimed in claim 1, wherein the cross-section area of the inside of the measurement slim-pipe is set to a value in the range of 0.75 mm$^2$ to 5 mm$^2$.

4. The device for detecting leakage of liquid in a tank as claimed in claim 1, wherein the measurement slim-pipe includes a first portion positioned inside a package defining the flow rate sensor section and a second portion connected to the upper end of the first portion.

5. The device for detecting leakage of liquid in a tank as claimed in claim 4, wherein the second portion is attached to the package.

6. The device for detecting leakage of liquid in a tank as claimed in claim 4, wherein the second portion is protruded inside the measurement pipe.

7. The device for detecting leakage of liquid in a tank as claimed in claim 1, wherein the temperature sensor includes a first temperature sensor and a second temperature sensor, and the flow rate sensor section includes the first temperature sensor, heater, and second temperature sensor which are sequentially arranged along the measurement slim-pipe.

8. The device for detecting leakage of liquid in a tank as claimed in claim 7, wherein the device further includes a leakage detection controller connected to the flow rate sensor section, the leakage detection controller having a voltage generation circuit for applying a voltage to the heater and a leakage detection circuit connected to the first and second temperature sensors and generating an output corresponding to a difference between temperatures detected by the first and second temperature sensors, and detecting leakage of the liquid in the tank based on a value equivalent to the liquid flow rate calculated using the output of the leakage detection circuit.

9. The device for detecting leakage of liquid in a tank as claimed in claim 8, wherein the device further includes a pressure sensor for measuring the liquid level of the liquid, and the leakage detection controller detects leakage of the liquid in a tank based on the magnitude of a liquid level variation rate with respect to time which is measured by the pressure sensor.

10. The device for detecting leakage of liquid in a tank as claimed in claim 9, wherein, when detecting leakage of the liquid in the tank based on the magnitude of the liquid level variation rate with respect to time, the leakage detection controller outputs a result of the leakage detection in the case where the magnitude of the liquid level variation rate with respect to time falls within a predetermined range; outputs a result of the leakage detection based on the value equivalent to the liquid flow rate in the case where the magnitude of the liquid level variation rate with respect to time falls below the predetermined range; and stops the output of a leakage detection signal in the case where the magnitude of the liquid level variation rate with respect to time falls above the predetermined range.

11. The device for detecting leakage of liquid in a tank as claimed in claim 9, wherein, in the case where the magnitude of the liquid level variation rate with respect to time falls above the predetermined range when detecting leakage of the liquid in the tank based on the magnitude of the liquid level variation rate with respect to time, the leakage detection controller stops the leakage detection based on the value equivalent to the liquid flow rate for a predetermined time length.

* * * * *